(12) United States Patent
Miao

(10) Patent No.: US 12,096,458 B2
(45) Date of Patent: Sep. 17, 2024

(54) MBS SERVICE MULTIPLEXING AND RESOURCE CONFIGURATION

(71) Applicant: Intel Corporation, Santa Clara, CA (US)

(72) Inventor: Honglei Miao, Munich (DE)

(73) Assignee: Intel Corporation, Santa Clara, CA (US)

( * ) Notice: Subject to any disclaimer, the term of this patent is extended or adjusted under 35 U.S.C. 154(b) by 221 days.

(21) Appl. No.: 17/508,163

(22) Filed: Oct. 22, 2021

(65) Prior Publication Data
US 2022/0046591 A1 Feb. 10, 2022

Related U.S. Application Data

(60) Provisional application No. 63/106,245, filed on Oct. 27, 2020, provisional application No. 63/104,302, filed on Oct. 22, 2020.

(51) Int. Cl.
| | | |
|---|---|---|
| H04W 56/00 | (2009.01) | |
| H04L 1/1812 | (2023.01) | |
| H04L 5/00 | (2006.01) | |
| H04W 72/02 | (2009.01) | |
| H04W 72/0446 | (2023.01) | |
| H04W 72/0453 | (2023.01) | |
| H04W 72/1273 | (2023.01) | |
| H04W 72/23 | (2023.01) | |
| H04W 72/30 | (2023.01) | |

(52) U.S. Cl.
CPC ........... *H04W 72/30* (2023.01); *H04L 1/1819* (2013.01); *H04L 5/0053* (2013.01); *H04W 72/02* (2013.01); *H04W 72/0446* (2013.01); *H04W 72/0453* (2013.01); *H04W 72/1273* (2013.01); *H04W 72/23* (2023.01)

(58) Field of Classification Search
CPC ..... H04W 72/30; H04W 72/23; H04W 72/02; H04W 72/0446; H04W 72/0453; H04W 72/1273; H04L 1/1819; H04L 5/0053
USPC ......................................................... 370/329
See application file for complete search history.

(56) References Cited

U.S. PATENT DOCUMENTS

| | | | |
|---|---|---|---|
| 2018/0368205 A1* | 12/2018 | Park .................... | H04W 76/30 |
| 2019/0165904 A1* | 5/2019 | Jo ........................ | H04W 76/11 |
| 2020/0204329 A1* | 6/2020 | Fujishiro ............ | H04L 1/1861 |
| 2021/0014893 A1* | 1/2021 | Park .................... | H04W 72/27 |
| 2021/0314930 A1* | 10/2021 | Uchiyama ............ | H04W 4/40 |
| 2022/0116914 A1* | 4/2022 | Yang .................... | H04W 72/02 |
| 2022/0116972 A1* | 4/2022 | Liu ....................... | H04L 1/08 |
| 2023/0050307 A1* | 2/2023 | Zhou .................... | H04W 4/06 |

(Continued)

*Primary Examiner* — Sai Ming Chan
(74) *Attorney, Agent, or Firm* — Schwegman Lundberg & Woessner, P.A.

(57) ABSTRACT

An apparatus and system to provide MBS transmissions are described. MBS-specific common resource pools are provided for simultaneously reception of multiple MBS transmissions. The pools have non/partial/fully-overlapped frequency resources in a UE-specific downlink BWP. A control resource set is associated with the pool to allocate the MBS downlink grant as well as the MBS data resource can within the pool. A slot contains multiple mini-slots that contain an MBS transmission, a unicast PDSCH transmission, and a second unicast PDSCH transmission for a different UE or to retransmit the MBS transmission. Control channel search spaces allocate different DCI formats in the slot.

20 Claims, 11 Drawing Sheets

(56) References Cited

U.S. PATENT DOCUMENTS

2023/0362960 A1* 11/2023 Adjakple .............. H04W 4/08
2023/0371046 A1* 11/2023 Babaei ............... H04W 72/121

* cited by examiner

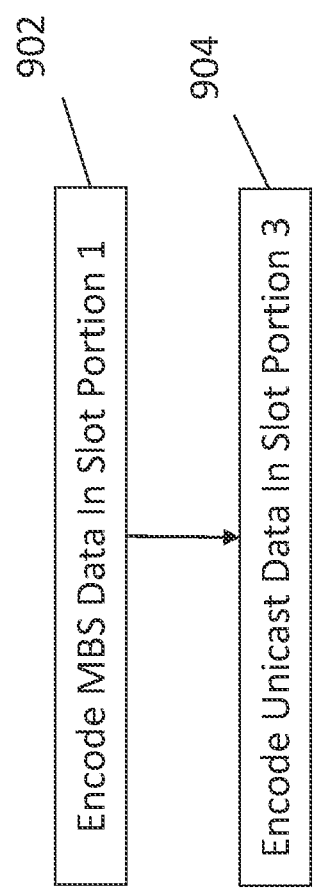

ns and U.S. Provisional Patent Application Ser. No. 63/106,245, filed Oct. 27, 2020, each of which is incorporated herein by reference in its entirety.

MBS SERVICE MULTIPLEXING AND RESOURCE CONFIGURATION

PRIORITY CLAIM

This application claims the benefit of priority under 35 U.S.C. 119(e) to U.S. Provisional Patent Application Ser. No. 63/104,302, filed Oct. 22, 2020, and U.S. Provisional Patent Application Ser. No. 63/106,245, filed Oct. 27, 2020, each of which is incorporated herein by reference in its entirety.

TECHNICAL FIELD

Embodiments pertain to next generation wireless communications. In particular, some embodiments relate to multicast-broadcast services (MBS) in 5G networks.

BACKGROUND

The use and complexity of wireless systems, which include 5$^{th}$ generation (5G) networks and are starting to include sixth generation (6G) networks among others, has increased due to both an increase in the types of devices user equipment (UEs) using network resources as well as the amount of data and bandwidth being used by various applications, such as video streaming, operating on these UEs. With the vast increase in number and diversity of communication devices, the corresponding network environment, including routers, switches, bridges, gateways, firewalls, and load balancers, has become increasingly complicated. As expected, a number of issues abound with the advent of any new technology.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

FIG. 9 illustrates another MBS process in accordance with some aspects.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1A:
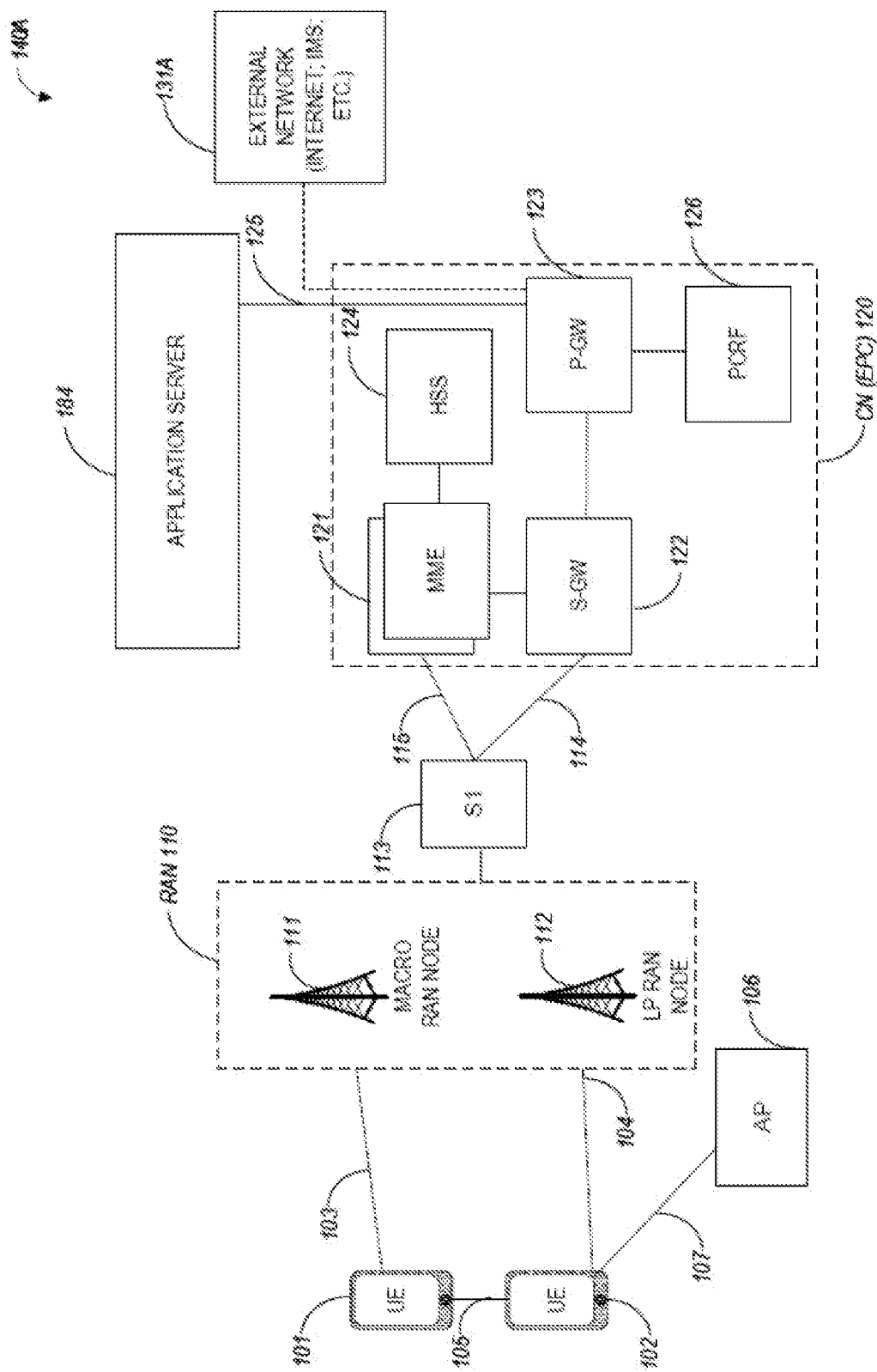
FIG. 1A illustrates an architecture of a network, in accordance with some aspects.

FIG. 1A illustrates an architecture of a network in accordance with some aspects. The network 140A includes 3GPP LTE/4G and NG network functions that may be extended to 6G functions. Accordingly, although 5G will be referred to, it is to be understood that this is to extend as able to 6G structures, systems, and functions. A network function can be implemented as a discrete network element on a dedicated hardware, as a software instance running on dedicated hardware, and/or as a virtualized function instantiated on an appropriate platform, e.g., dedicated hardware or a cloud infrastructure.

The network 140A is shown to include user equipment (UE) 101 and UE 102. The UEs 101 and 102 are illustrated as smartphones (e.g., handheld touchscreen mobile computing devices connectable to one or more cellular networks) but may also include any mobile or non-mobile computing device, such as portable (laptop) or desktop computers, wireless handsets, drones, or any other computing device including a wired and/or wireless communications interface. The UEs 101 and 102 can be collectively referred to herein as UE 101, and UE 101 can be used to perform one or more of the techniques disclosed herein.

Any of the radio links described herein (e.g., as used in the network 140A or any other illustrated network) may operate according to any exemplary radio communication technology and/or standard. Any spectrum management scheme including, for example, dedicated licensed spectrum, unlicensed spectrum, (licensed) shared spectrum (such as Licensed Shared Access (LSA) in 2.3-2.4 GHz, 3.4-3.6 GHz, 3.6-3.8 GHz, and other frequencies and Spectrum Access System (SAS) in 3.55-3.7 GHz and other frequencies). Different Single Carrier or Orthogonal Frequency Domain Multiplexing (OFDM) modes (CP-OFDM, SC-FDMA, SC-OFDM, filter bank-based multicarrier (FBMC), OFDMA, etc.), and in particular 3GPP NR, may be used by allocating the OFDM carrier data bit vectors to the corresponding symbol resources.

In some aspects, any of the UEs 101 and 102 can comprise an Internet-of-Things (IoT) UE or a Cellular IoT (CIoT) UE, which can comprise a network access layer designed for low-power IoT applications utilizing short-lived UE connections. In some aspects, any of the UEs 101 and 102 can include a narrowband (NB) IoT UE (e.g., such as an enhanced NB-IoT (eNB-IoT) UE and Further Enhanced (FeNB-IoT) UE). An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network includes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network. In some aspects, any of the UEs 101 and 102 can include enhanced MTC (eMTC) UEs or further enhanced MTC (FeMTC) UEs.

The UEs 101 and 102 may be configured to connect, e.g., communicatively couple, with a radio access network (RAN) 110. The RAN 110 may be, for example, an Evolved Universal Mobile Telecommunications System (UMTS) Terrestrial Radio Access Network (E-UTRAN), a NextGen RAN (NG RAN), or some other type of RAN.

The UEs 101 and 102 utilize connections 103 and 104, respectively, each of which comprises a physical communications interface or layer (discussed in further detail below); in this example, the connections 103 and 104 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a 5G protocol, a 6G protocol, and the like.

In an aspect, the UEs 101 and 102 may further directly exchange communication data via a ProSe interface 105. The ProSe interface 105 may alternatively be referred to as a sidelink (SL) interface comprising one or more logical channels, including but not limited to a Physical Sidelink Control Channel (PSCCH), a Physical Sidelink Shared Channel (PSSCH), a Physical Sidelink Discovery Channel (PSDCH), a Physical Sidelink Broadcast Channel (PSBCH), and a Physical Sidelink Feedback Channel (PSFCH).

The UE 102 is shown to be configured to access an access point (AP) 106 via connection 107. The connection 107 can comprise a local wireless connection, such as, for example, a connection consistent with any IEEE 802.11 protocol, according to which the AP 106 can comprise a wireless fidelity (WiFi®) router. In this example, the AP 106 is shown to be connected to the Internet without connecting to the core network of the wireless system (described in further detail below).

The RAN 110 can include one or more access nodes that enable the connections 103 and 104. These access nodes (ANs) can be referred to as base stations (BSs), NodeBs, evolved NodeBs (eNBs), Next Generation NodeBs (gNBs), RAN nodes, and the like, and can comprise ground stations (e.g., terrestrial access points) or satellite stations providing coverage within a geographic area (e.g., a cell). In some aspects, the communication nodes 111 and 112 can be transmission/reception points (TRPs). In instances when the communication nodes 111 and 112 are NodeBs (e.g., eNBs or gNBs), one or more TRPs can function within the communication cell of the NodeBs. The RAN 110 may include one or more RAN nodes for providing macrocells, e.g., macro RAN node 111, and one or more RAN nodes for providing femtocells or picocells (e.g., cells having smaller coverage areas, smaller user capacity, or higher bandwidth compared to macrocells), e.g., low power (LP) RAN node 112.

Any of the RAN nodes 111 and 112 can terminate the air interface protocol and can be the first point of contact for the UEs 101 and 102. In some aspects, any of the RAN nodes 111 and 112 can fulfill various logical functions for the RAN 110 including, but not limited to, radio network controller (RNC) functions such as radio bearer management, uplink and downlink dynamic radio resource management and data packet scheduling, and mobility management. In an example, any of the nodes 111 and/or 112 can be a gNB, an eNB, or another type of RAN node.

The RAN 110 is shown to be communicatively coupled to a core network (CN) 120 via an S1 interface 113. In aspects, the CN 120 may be an evolved packet core (EPC) network, a NextGen Packet Core (NPC) network, or some other type of CN (e.g., as illustrated in reference to FIGS. 1B-1C). In this aspect, the S1 interface 113 is split into two parts: the S1-U interface 114, which carries traffic data between the RAN nodes 111 and 112 and the serving gateway (S-GW) 122, and the S1-mobility management entity (MME) interface 115, which is a signaling interface between the RAN nodes 111 and 112 and MMEs 121.

In this aspect, the CN 120 comprises the MMEs 121, the S-GW 122, the Packet Data Network (PDN) Gateway (P-GW) 123, and a home subscriber server (HSS) 124. The MMEs 121 may be similar in function to the control plane of legacy Serving General Packet Radio Service (GPRS) Support Nodes (SGSN). The MMEs 121 may manage mobility aspects in access such as gateway selection and tracking area list management. The HSS 124 may comprise a database for network users, including subscription-related information to support the network entities' handling of communication sessions. The CN 120 may comprise one or several HSSs 124, depending on the number of mobile subscribers, on the capacity of the equipment, on the organization of the network, etc. For example, the HSS 124 can provide support for routing/roaming, authentication, authorization, naming/addressing resolution, location dependencies, etc.

The S-GW 122 may terminate the S1 interface 113 towards the RAN 110, and routes data packets between the RAN 110 and the CN 120. In addition, the S-GW 122 may be a local mobility anchor point for inter-RAN node handovers and also may provide an anchor for inter-3GPP mobility. Other responsibilities of the S-GW 122 may include a lawful intercept, charging, and some policy enforcement.

The P-GW 123 may terminate an SGi interface toward a PDN. The P-GW 123 may route data packets between the CN 120 and external networks such as a network including the application server 184 (alternatively referred to as application function (AF)) via an Internet Protocol (IP) interface 125. The P-GW 123 can also communicate data to other external networks 131A, which can include the Internet, IP multimedia subsystem (IPS) network, and other networks. Generally, the application server 184 may be an element offering applications that use IP bearer resources with the core network (e.g., UMTS Packet Services (PS) domain, LTE PS data services, etc.). In this aspect, the P-GW 123 is shown to be communicatively coupled to an application server 184 via an IP interface 125. The application server 184 can also be configured to support one or more communication services (e.g., Voice-over-Internet Protocol (VoIP)

sessions, PTT sessions, group communication sessions, social networking services, etc.) for the UEs 101 and 102 via the CN 120.

The P-GW 123 may further be a node for policy enforcement and charging data collection. Policy and Charging Rules Function (PCRF) 126 is the policy and charging control element of the CN 120. In a non-roaming scenario, in some aspects, there may be a single PCRF in the Home Public Land Mobile Network (HPLMN) associated with a UE's Internet Protocol Connectivity Access Network (IP-CAN) session. In a roaming scenario with a local breakout of traffic, there may be two PCRFs associated with a UE's IP-CAN session: a Home PCRF (H-PCRF) within an HPLMN and a Visited PCRF (V-PCRF) within a Visited Public Land Mobile Network (VPLMN). The PCRF 126 may be communicatively coupled to the application server 184 via the P-GW 123.

In some aspects, the communication network 140A can be an IoT network or a 5G or 6G network, including 5G new radio network using communications in the licensed (5G NR) and the unlicensed (5G NR-U) spectrum. One of the current enablers of IoT is the narrowband-IoT (NB-IoT). Operation in the unlicensed spectrum may include dual connectivity (DC) operation and the standalone LTE system in the unlicensed spectrum, according to which LTE-based technology solely operates in unlicensed spectrum without the use of an "anchor" in the licensed spectrum, called MulteFire. Further enhanced operation of LTE systems in the licensed as well as unlicensed spectrum is expected in future releases and 5G systems. Such enhanced operations can include techniques for sidelink resource allocation and UE processing behaviors for NR sidelink V2X communications.

An NG system architecture (or 6G system architecture) can include the RAN 110 and a 5G core network (5GC) 120. The NG-RAN 110 can include a plurality of nodes, such as gNBs and NG-eNBs. The CN 120 (e.g., a 5G core network/5GC) can include an access and mobility function (AMF) and/or a user plane function (UPF). The AMF and the UPF can be communicatively coupled to the gNBs and the NG-eNBs via NG interfaces. More specifically, in some aspects, the gNBs and the NG-eNBs can be connected to the AMF by NG-C interfaces, and to the UPF by NG-U interfaces. The gNBs and the NG-eNBs can be coupled to each other via Xn interfaces.

In some aspects, the NG system architecture can use reference points between various nodes. In some aspects, each of the gNBs and the NG-eNBs can be implemented as a base station, a mobile edge server, a small cell, a home eNB, and so forth. In some aspects, a gNB can be a master node (MN) and NG-eNB can be a secondary node (SN) in a 5G architecture.

Figure 1B:
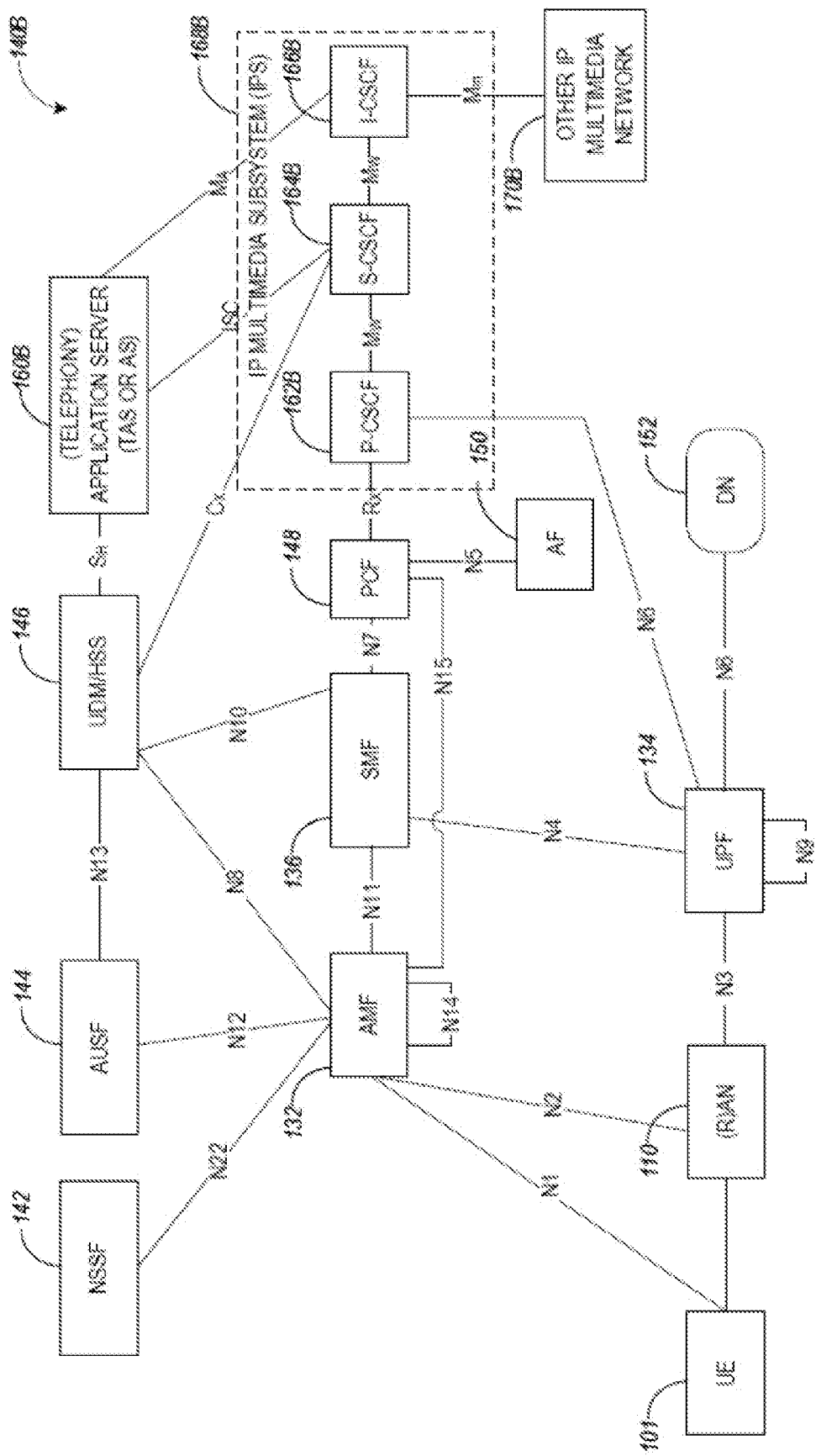
FIG. 1B illustrates a non-roaming 5G system architecture in accordance with some aspects.

FIG. 1B illustrates a non-roaming 5G system architecture in accordance with some aspects. In particular, FIG. 1B illustrates a 5G system architecture 140B in a reference point representation, which may be extended to a 6G system architecture. More specifically, UE 102 can be in communication with RAN 110 as well as one or more other 5GC network entities. The 5G system architecture 140B includes a plurality of network functions (NFs), such as an AMF 132, session management function (SMF) 136, policy control function (PCF) 148, application function (AF) 150, UPF 134, network slice selection function (NSSF) 142, authentication server function (AUSF) 144, and unified data management (UDM)/home subscriber server (HSS) 146.

The UPF 134 can provide a connection to a data network (DN) 152, which can include, for example, operator services, Internet access, or third-party services. The AMF 132 can be used to manage access control and mobility and can also include network slice selection functionality. The AMF 132 may provide UE-based authentication, authorization, mobility management, etc., and may be independent of the access technologies. The SMF 136 can be configured to set up and manage various sessions according to network policy. The SMF 136 may thus be responsible for session management and allocation of IP addresses to UEs. The SMF 136 may also select and control the UPF 134 for data transfer. The SMF 136 may be associated with a single session of a UE 101 or multiple sessions of the UE 101. This is to say that the UE 101 may have multiple 5G sessions. Different SMFs may be allocated to each session. The use of different SMFs may permit each session to be individually managed. As a consequence, the functionalities of each session may be independent of each other.

The UPF 134 can be deployed in one or more configurations according to the desired service type and may be connected with a data network. The PCF 148 can be configured to provide a policy framework using network slicing, mobility management, and roaming (similar to PCRF in a 4G communication system). The UDM can be configured to store subscriber profiles and data (similar to an HSS in a 4G communication system).

The AF 150 may provide information on the packet flow to the PCF 148 responsible for policy control to support a desired QoS. The PCF 148 may set mobility and session management policies for the UE 101. To this end, the PCF 148 may use the packet flow information to determine the appropriate policies for proper operation of the AMF 132 and SMF 136. The AUSF 144 may store data for UE authentication.

In some aspects, the 5G system architecture 140B includes an IP multimedia subsystem (IMS) 168B as well as a plurality of IP multimedia core network subsystem entities, such as call session control functions (CSCFs). More specifically, the IMS 168B includes a CSCF, which can act as a proxy CSCF (P-CSCF) 162BE, a serving CSCF (S-CSCF) 164B, an emergency CSCF (E-CSCF) (not illustrated in FIG. 1B), or interrogating CSCF (I-CSCF) 166B. The P-CSCF 162B can be configured to be the first contact point for the UE 102 within the 1M subsystem (IMS) 168B. The S-CSCF 164B can be configured to handle the session states in the network, and the E-CSCF can be configured to handle certain aspects of emergency sessions such as routing an emergency request to the correct emergency center or PSAP. The I-CSCF 166B can be configured to function as the contact point within an operator's network for all IMS connections destined to a subscriber of that network operator, or a roaming subscriber currently located within that network operator's service area. In some aspects, the I-CSCF 166B can be connected to another IP multimedia network 170E, e.g. an IMS operated by a different network operator.

In some aspects, the UDM/HSS 146 can be coupled to an application server 160E, which can include a telephony application server (TAS) or another application server (AS). The AS 160B can be coupled to the IMS 168B via the S-CSCF 164B or the I-CSCF 166B.

A reference point representation shows that interaction can exist between corresponding NF services. For example, FIG. 1B illustrates the following reference points: N1 (between the UE 102 and the AMF 132), N2 (between the RAN 110 and the AMF 132), N3 (between the RAN 110 and the UPF 134), N4 (between the SMF 136 and the UPF 134), N5 (between the PCF 148 and the AF 150, not shown), N6

(between the UPF 134 and the DN 152), N7 (between the SMF 136 and the PCF 148, not shown), N8 (between the UDM 146 and the AMF 132, not shown), N9 (between two UPFs 134, not shown), N10 (between the UDM 146 and the SMF 136, not shown), N11 (between the AMF 132 and the SMF 136, not shown), N12 (between the AUSF 144 and the AMF 132, not shown), N13 (between the AUSF 144 and the UDM 146, not shown), N14 (between two AMFs 132, not shown), N15 (between the PCF 148 and the AMF 132 in case of a non-roaming scenario, or between the PCF 148 and a visited network and AMF 132 in case of a roaming scenario, not shown), N16 (between two SMFs, not shown), and N22 (between AMF 132 and NSSF 142, not shown). Other reference point representations not shown in FIG. 1B can also be used.

Figure 1C:
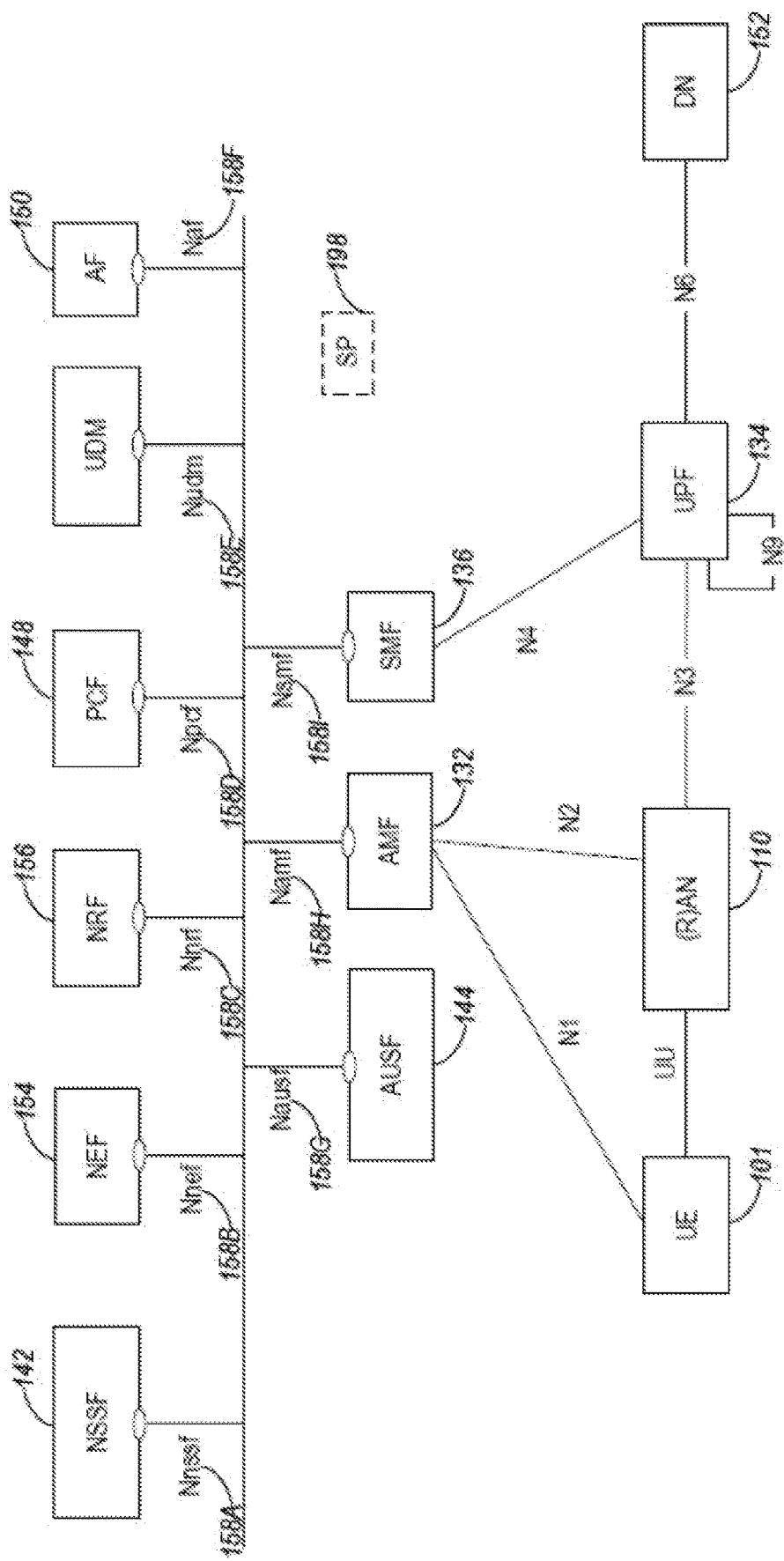
FIG. 1C illustrates a non-roaming 5G system architecture in accordance with some aspects.

FIG. 1C illustrates a 5G system architecture 140C and a service-based representation. In addition to the network entities illustrated in FIG. 1B, system architecture 140C can also include a network exposure function (NEF) 154 and a network repository function (NRF) 156. In some aspects, 5G system architectures can be service-based and interaction between network functions can be represented by corresponding point-to-point reference points Ni or as service-based interfaces.

In some aspects, as illustrated in FIG. 1C, service-based representations can be used to represent network functions within the control plane that enable other authorized network functions to access their services. In this regard, 5G system architecture 140C can include the following service-based interfaces: Namf 158H (a service-based interface exhibited by the AMF 132), Nsmf 158I (a service-based interface exhibited by the SMF 136), Nnef 158B (a service-based interface exhibited by the NEF 154), Npcf 158D (a service-based interface exhibited by the PCF 148), a Nudm 158E (a service-based interface exhibited by the UDM 146), Naf 158F (a service-based interface exhibited by the AF 150), Nnrf 158C (a service-based interface exhibited by the NRF 156), Nnssf 158A (a service-based interface exhibited by the NSSF 142), Nausf 158G (a service-based interface exhibited by the AUSF 144). Other service-based interfaces (e.g., Nudr, N5g-eir, and Nudsf) not shown in FIG. 1C can also be used.

NR-V2X architectures may support high-reliability low latency sidelink communications with a variety of traffic patterns, including periodic and aperiodic communications with random packet arrival time and size. Techniques disclosed herein can be used for supporting high reliability in distributed communication systems with dynamic topologies, including sidelink NR V2X communication systems.

Figure 2:
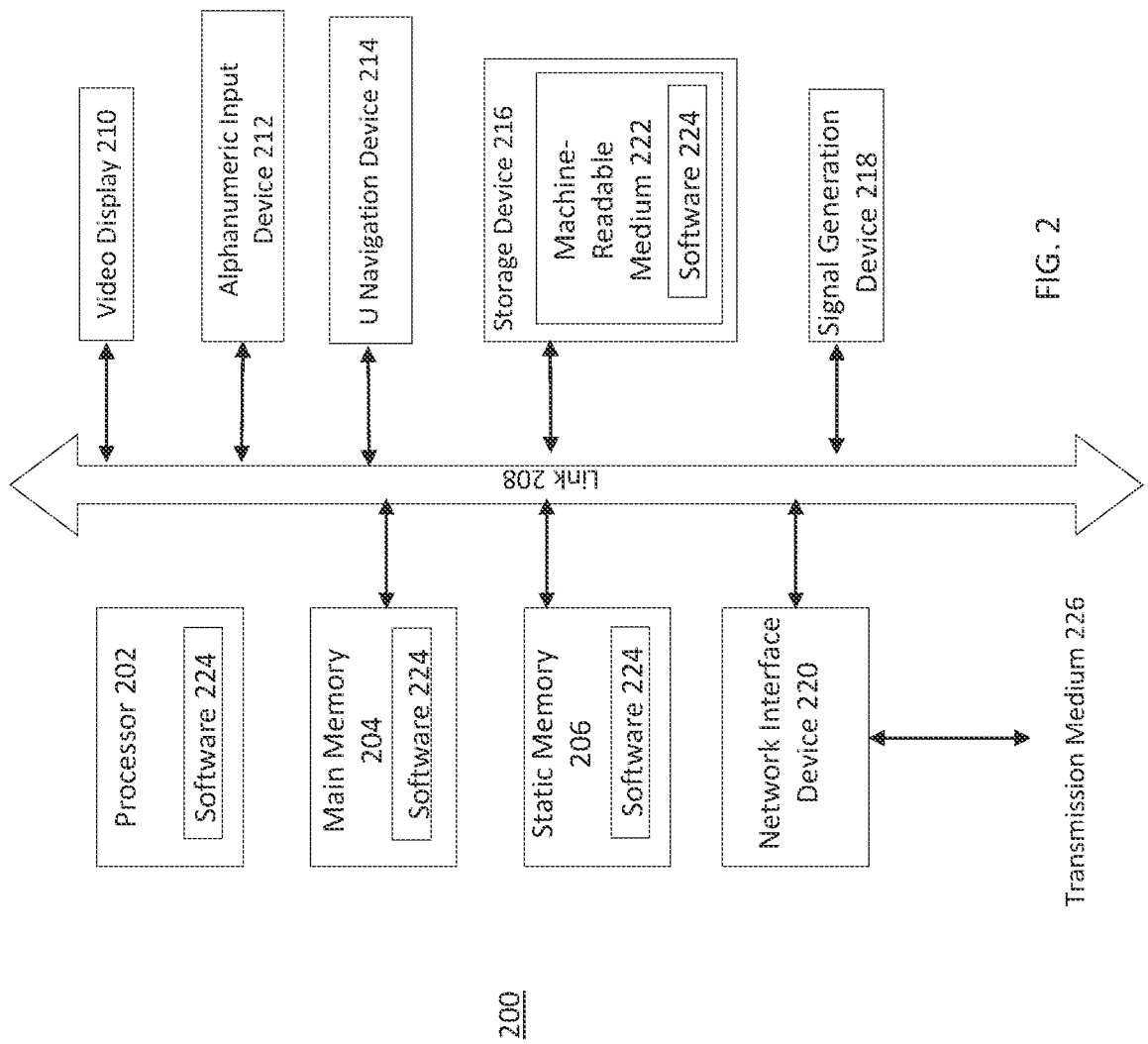
FIG. 2 illustrates a block diagram of a communication device in accordance with some embodiments.

FIG. 2 illustrates a block diagram of a communication device in accordance with some embodiments. The communication device 200 may be a UE such as a specialized computer, a personal or laptop computer (PC), a tablet PC, or a smart phone, dedicated network equipment such as an eNB, a server running software to configure the server to operate as a network device, a virtual device, or any machine capable of executing instructions (sequential or otherwise) that specify actions to be taken by that machine. For example, the communication device 200 may be implemented as one or more of the devices shown in FIGS. 1A-1C. Note that communications described herein may be encoded before transmission by the transmitting entity (e.g., UE, gNB) for reception by the receiving entity (e.g., gNB, UE) and decoded after reception by the receiving entity.

Examples, as described herein, may include, or may operate on, logic or a number of components, modules, or mechanisms. Modules and components are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" (and "component") is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The communication device 200 may include a hardware processor (or equivalently processing circuitry) 202 (e.g., a central processing unit (CPU), a GPU, a hardware processor core, or any combination thereof), a main memory 204 and a static memory 206, some or all of which may communicate with each other via an interlink (e.g., bus) 208. The main memory 204 may contain any or all of removable storage and non-removable storage, volatile memory or non-volatile memory. The communication device 200 may further include a display unit 210 such as a video display, an alphanumeric input device 212 (e.g., a keyboard), and a user interface (UI) navigation device 214 (e.g., a mouse). In an example, the display unit 210, input device 212 and UI navigation device 214 may be a touch screen display. The communication device 200 may additionally include a storage device (e.g., drive unit) 216, a signal generation device 218 (e.g., a speaker), a network interface device 220, and one or more sensors, such as a global positioning system (GPS) sensor, compass, accelerometer, or other sensor. The communication device 200 may further include an output controller, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 216 may include a non-transitory machine readable medium 222 (hereinafter simply referred to as machine readable medium) on which is stored one or more sets of data structures or instructions 224 (e.g., software) embodying or utilized by any one or more of the techniques or functions described herein. The instructions 224 may also reside, completely or at least partially, within the main memory 204, within static memory 206, and/or within the hardware processor 202 during execution thereof by the communication device 200. While the machine readable medium 222 is illustrated as a single medium, the term "machine readable medium" may include a single medium or multiple media (e.g., a centralized or distributed database, and/or associated caches and servers) configured to store the one or more instructions 224.

The term "machine readable medium" may include any medium that is capable of storing, encoding, or carrying instructions for execution by the communication device 200 and that cause the communication device 200 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks.

The instructions 224 may further be transmitted or received over a communications network using a transmission medium 226 via the network interface device 220 utilizing any one of a number of wireless local area network (WLAN) transfer protocols (e.g., frame relay, interne protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks. Communications over the networks may include one or more different protocols, such as Institute of Electrical and Electronics Engineers (IEEE) 802.11 family of standards known as Wi-Fi, IEEE 802.16 family of standards known as WiMax, IEEE 802.15.4 family of standards, a Long Term Evolution (LTE) family of standards, a Universal Mobile Telecommunications System (UMTS) family of standards, peer-to-peer (P2P) networks, a next generation (NG)/5$^{th}$ generation (5G) standards among others. In an example, the network interface device 220 may include one or more physical jacks (e.g., Ethernet, coaxial, or phone jacks) or one or more antennas to connect to the transmission medium 226.

Note that the term "circuitry" as used herein refers to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" or "processor" as used herein thus refers to, is part of, or includes circuitry capable of sequentially and automatically carrying out a sequence of arithmetic or logical operations, or recording, storing, and/or transferring digital data. The term "processor circuitry" or "processor" may refer to one or more application processors, one or more baseband processors, a physical central processing unit (CPU), a single- or multi-core processor, and/or any other device capable of executing or otherwise operating computer-executable instructions, such as program code, software modules, and/or functional processes.

Any of the radio links described herein may operate according to any one or more of the following radio communication technologies and/or standards including but not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17) and subsequent Releases (such as Rel. 18, Rel. 19, etc.), 3GPP 5G, 5G, 5G New Radio (5G NR), 3GPP 5G New Radio, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication System/Extended Total Access Communication System (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handy-phone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p or IEEE 802.11bd and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication systems such as Intelligent-Transport-Systems and others (typically operating in 5850 MHz to 5925 MHz or above (typically up to 5935 MHz following change proposals in CEPT Report 71)), the European ITS-G5 system (i.e. the European flavor of IEEE 802.11p based DSRC, including ITS-G5A (i.e., Operation of ITS-G5 in European ITS frequency bands dedicated to ITS for safety related applications in the frequency range 5,875 GHz to 5,905 GHz), ITS-G5B (i.e., Operation in European ITS frequency bands dedicated to ITS non-safety applications in the frequency range 5,855 GHz to 5,875 GHz), ITS-G5C (i.e., Operation of ITS applications in the frequency range 5,470 GHz to 5,725 GHz)), DSRC in Japan in the 700 MHz band (including 715 MHz to 725 MHz), IEEE 802.11bd based systems, etc.

Aspects described herein can be used in the context of any spectrum management scheme including dedicated licensed spectrum, unlicensed spectrum, license exempt spectrum, (licensed) shared spectrum (such as LSA=Licensed Shared Access in 2.3-2.4 GHz, 3.4-3.6 GHz, 3.6-3.8 GHz and further frequencies and SAS=Spectrum Access System/CBRS=Citizen Broadband Radio System in 3.55-3.7 GHz and further frequencies). Applicable spectrum bands include IMT (International Mobile Telecommunications) spectrum as, well as other types of spectrum/bands, such as bands with national allocation (including 450-470 MHz, 902-928 MHz (note: allocated for example in US (FCC Part 15)), 863-868.6 MHz (note: allocated for example in European Union (ETSI EN 300 220)), 915.9-929.7 MHz (note: allocated for example in Japan), 917-923.5 MHz (note: allocated for example in South Korea, 755-779 MHz and 779-787 MHz (note: allocated for example in China), 790-960 MHz, 1710-2025 MHz, 2110-2200 MHz, 2300-2400 MHz, 2.4-2.4835 GHz (note: it is an ISM band with global availability and it is used by Wi-Fi technology family (11b/g/n/ax) and also by Bluetooth), 2500-2690 MHz, 698-790 MHz, 610-790 MHz, 3400-3600 MHz, 3400-3800 MHz, 3800-4200 MHz, 3.55-3.7 GHz (note: allocated for example in the US for Citizen Broadband Radio Service), 5.15-5.25 GHz and 5.25-5.35 GHz and 5.47-5.725 GHz and 5.725-5.85 GHz bands (note: allocated for example in the US (FCC part 15), consists four U-NII bands in total 500 MHz spectrum), 5.725-5.875 GHz (note: allocated for example in EU (ETSI EN 301 893)), 5.47-5.65 GHz (note: allocated for example in South Korea, 5925-7125 MHz and 5925-6425 MHz band (note: under consideration in US and EU, respectively. Next generation Wi-Fi system is expected to include the 6 GHz spectrum as operating band but it is noted that, as of December 2017, Wi-Fi system is not yet allowed in this band. Regulation is expected to be finished in 2019-2020 time frame), IMT-advanced spectrum, IMT-2020 spectrum (expected to include 3600-3800 MHz, 3800-4200 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 71-76 GHz, 81-86 GHz and 92-94 GHz, etc), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), 57-64/66 GHz (note: this band has near-global designation for Multi-Gigabit Wireless Systems (MGWS)/WiGig. In US (FCC part 15) allocates total 14 GHz spectrum, while EU (ETSI EN 302 567 and ETSI EN 301 217-2 for fixed P2P) allocates total 9 GHz spectrum), the 70.2 GHz-71 GHz band, any band between 65.88 GHz and 71 GHz, bands currently allocated to automotive radar applications such as 76-81 GHz, and future bands including 94-300 GHz and above. Furthermore, the scheme can be used on a secondary basis on bands such as the TV White Space bands (typically below 790 MHz) where in particular the 400 MHz and 700 MHz bands are promising candidates. Besides cellular applications, specific applications for vertical markets may be addressed such as PMSE (Program Making and Special Events), medical, health, surgery, automotive, low-latency, drones, etc. applications.

Aspects described herein can also implement a hierarchical application of the scheme is possible, e.g., by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc.

Aspects described herein can also be applied to different Single Carrier or OFDM flavors (CP-OFDM, SC-FDMA, SC-OFDM, filter bank-based multicarrier (FBMC), OFDMA, etc.) and in particular 3GPP NR (New Radio) by allocating the OFDM carrier data bit vectors to the corresponding symbol resources.

Some of the features in this document are defined for the network side, such as APs, eNBs, NR or gNBs—note that this term is typically used in the context of 3GPP 5G and 6G communication systems, etc. Still, a UE may take this role as well and act as an AP, eNB, or gNB; that is some or all features defined for network equipment may be implemented by a UE.

As above, MBS services over 5G system (5GS) is a technique used to provide communications that may be used to benefit a number of use cases, including public safety and mission critical, vehicle-to-everything (V2X) applications, transparent IPv4/IPv6 multicast delivery, IPTV, software delivery over wireless, group communications and internet-of-things (IoT) applications. In industry use cases, e.g., motion control, sometimes groupcast/multicast messages with multiple intended receivers are transmitted from the controller to the UEs. However, so far NR systems do not support multicast transmission in the Uu interface between the UE and RAN node (as shown in FIG. 1C). Therefore, multicast messages from the application server are duplicated by the user plane function (UPF) to all the involved UE-specific protocol data unit (PDU) sessions. As a result, the duplicated multicast messages in each UE PDU session are transmitted as a unicast message, which are further transmitted to each UE separately over the radio resources. It is clear that multicast messages repeatedly transmitted by unicast messages, especially for periodic traffic, can cause huge radio resource consumption, leading to a low spectrum efficiency for the information delivery as well as a large latency variation for different UEs. It can be very beneficial to support multicast/groupcast transmission at least for periodic traffic which yields a persistent traffic demand over a considerable time span. Moreover, due to the open access nature of the wireless medium, MBS support in NR Uu interface for periodic traffic can be efficiently realized. Depending on the control application, some UEs may participate several multicast groups simultaneously to receive different type of information. In this scenario, efficient configuration of MBS resources to UEs is desirable to support multiple MBS data transmission with potentially different quality of service (QoS) requirements.

This methods are disclosed herein to enable a MBS UE to support one or several MBS-specific common resource pools and the respective control resource configurations for simultaneously reception of multiple MBS data traffic. Specifically, multiple MBS-specific common resource pools can be configured with non/partial/fully-overlapped frequency resources in a UE-specific downlink bandwidth part (BWP) according to the actual MBS QoS requirements. The control resource set can be associated with a MBS-specific common resource pool so that a MBS downlink grant as well as the scheduled MBS data resource can be allocated within the MBS-specific common resource pool shared by all member UEs in the group. As a result, multiple multicast/broadcast services can be communicated to different UEs receiving different subsets of MBSs served by the system. The methods herein enable the system to optimize the overall radio resource efficiency according to the MBS QoS requirements as well as the collective channel quality of all involved UEs.

Method—1: MBS Specific Common Resource Pool Configuration

In this method, for each supported MBS of a UE, a dedicated common resource pool can be configured to the UE. When multiple MBSs are subscribed and received by a UE, and each MBS may involve a different multicast group of member UEs, consequently multiple MBS-specific common resource pools can be configured to the UE. Due to potentially different traffic data rates among different MBSs depending on the respective QoS requirements, bandwidths of MBS-specific common resource pools are able to be different. Multiple MBS-specific common resource pools can be configured with overlapped or non-overlapped frequency resources. For frequency domain overlapped MBS-specific common resource pools, the gNB schedules different MBS data transmissions at different times, i.e., (mini-) slots, to avoid resource conflicts. For periodic MBS data transmission, configured grants for different MBSs with overlapped common resource pools in the frequency domain can be scheduled in a time-domain multiplexed (TDM) manner to avoid transmission resource blocking.

Figure 3C:
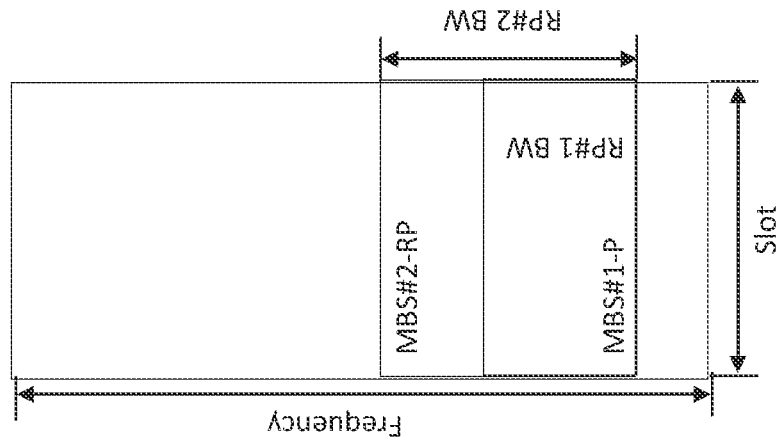
FIG. 3C illustrates fully overlapped MBS-specific resource pools in accordance with some aspects.
Figure 3B:
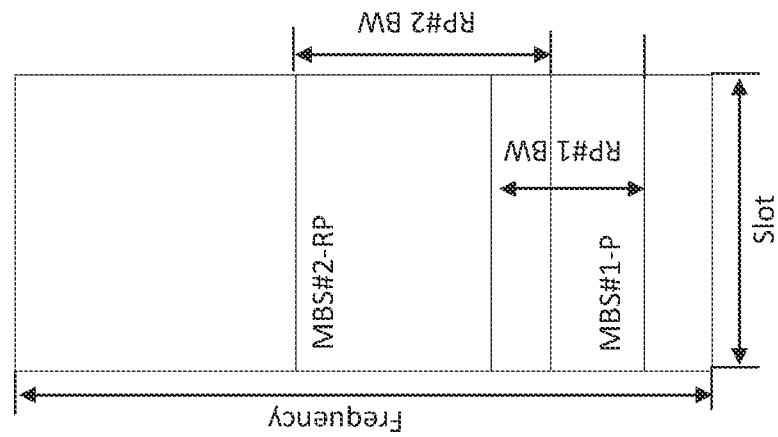
FIG. 3B illustrates partially overlapped MBS-specific resource pools in accordance with some aspects.
Figure 3A:
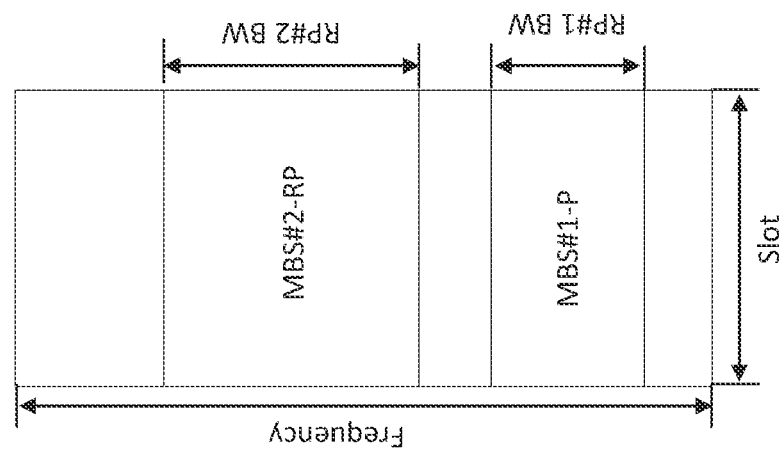
FIG. 3A illustrates non-overlapped MBS-specific resource pools in accordance with some aspects.

FIG. 3A illustrates non-overlapped MBS-specific resource pools in accordance with some aspects. FIG. 3B illustrates partially overlapped MBS-specific resource pools in accordance with some aspects. FIG. 3C illustrates fully overlapped MBS-specific resource pools in accordance with some aspects. As shown in FIGS. 3A-3C, for a UE supporting multiple MBSs simultaneously, multiple MBS-specific resource pools can be configured, each of which is used for the respective MBS data transmission. When the resource pools corresponding to different MBSs are non-overlapped, e.g., as shown in FIGS. 3A-3C, the data transmission of these MBSs can occur simultaneously, i.e., during the same slot. For those BMSs with overlapped resource pools, the data transmission of these BMSs can only take place in TDM manner with same frequency resources. By virtue of multiple MBS-specific resource pool configurations, the UE can receive the traffic of multiple MBSs in the same RRC connected state.

Method—2: Control Channel Resource Configuration for MBS-Specific Resource Pool

In this method, group common physical downlink control channel (PDCCH) scheduling MBS data transmission signals the frequency resource in the MBS-specific common resource pool by using the resource addresses defined in the common resource pool shared by all the member UEs in the multicast/broadcast group. Moreover, the control resource set (CORESET) from which the group common PDCCH scheduling MBS data transmission is also allocated in the MBS-specific common resource pool. As a result, both group common PDCCH and the transmission resources signaled in the group common downlink control information (DCI) can be correctly addressed by all the intended UEs configured with the same common resource pool allocated for the corresponding MBS. To do this, one or more MBS-specific common resource pools, namely MBS-resource-Pool, can be added to the RRC information element (IE) BWP-Downlink and each CORESET in which group common PDCCH scheduling MBS data is transmitted may be associated with a particular configured common resource pool. When multiple MBS-resourcePools are configured in a BWP, the MBS-resourcePools can be non(partial/fully)-overlapped in frequency domain as described in Method-1. Specifically, RRC IE BWP-Downlink can be enhanced as follows:

```
MBS-ResourePool-Id ::=      INTEGER (0..3)
MBS-ResourcePool ::=        SEQUENCE {
    mbs-resourePool-id          MBS-ResourePool-Id,
    locationAndBandwidth        INTEGER (0..37949),
    subcarrierSpacing           SubcarrierSpacing, OPTIONAL
    cyclicPrefix                ENUMERATED { extended } OPTIONAL -- Need R
}
BWP-Downlink ::=            SEQUENCE {
    ...
    mbs-resourcePoolToAddModList SEQUENCE(SIZE (1..4)) OF MBS-
ResourcePool
    mbs-resourcePoolToRemoveList SEQUENCE(SIZE (1..4)) OF MBS-
ResourePool-Id
    ...
}
ControlResourceSet ::=          SEQUENCE {
    ...
    mbs-resourcePool-id MBS-ResourePool-Id, OPTIONAL
    ...
}
```

Where:
  Type MBS-ResourcePool-Id defines the type of the MBS-specific resource pool ID numbered in a downlink BWP. In one downlink BWP, multiple MBS resource pools can be allocated. Each MBS resource pool can be identified by the respective ID.
  RRC IE MBS-ResourcePool defines the MBS-specific resource pool with the following parameters:
    mbs-resourcePool-id defines the MBS-specific resource pool ID.
    locationAndBandwidth defines the frequency domain location and bandwidth of the MBS resource pool in the bandwidth part. It is calculated with the same approach as the locationAndBandwidth parameter defined in BWP.
    subcarrierSpacing defines the subcarrier spacing of the MBS resource pool. When this parameter is absent, the subcarrier spacing of the BWP is used for the resource pool.
    cyclicPrefix defines the cyclic prefix (CP) of the MBS resource pool. When absent, the CP of BWP is used for the resource pool.
  Parameter mbs-resourcePoolToAddModList in RRC IE BWP-Downlink defines a list of MBS-specific resource pools to be added to the downlink BWP, i.e., MBS-ResourcePool. Each MBS-specific resource pool is configured with its own characteristics in terms of frequency location and bandwidth, subcarrier spacing and CP duration.
  Parameter mbs-resourcePoolToRemoveList defines the list of MBS-specific resource pools to be removed from the downlink BWP.
  Parameter mbs-resourcePool-id is added to RRC IE ControlResourceSet to define the associated MBS-specific resource pool for the CORESET. When the CORESET is associated with an MBS-specific resource pool, the CORESET provides the resources for the search space (SS) of the group common PDCCH scheduling the MBS data. When the parameter is absent, the CORESET is associated with the BWP and used for normal UE-specific SS and cell-specific common SS.

Figure 4:
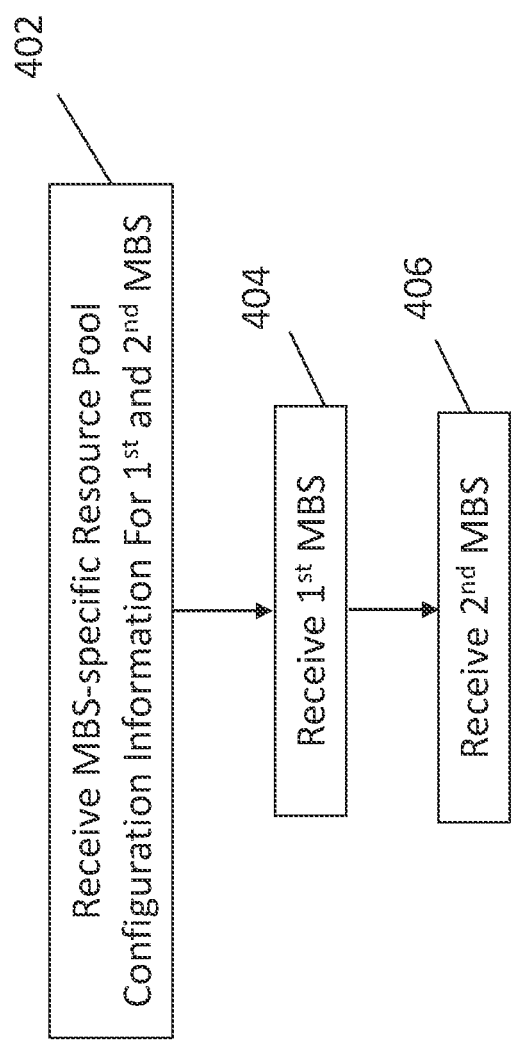
FIG. 4 illustrates an MBS process in accordance with some aspects.

FIG. 4 illustrates an MBS process in accordance with some aspects. FIG. 4 may be implemented by a UE or a portion thereof. Other operations may be present, but are not shown for convenience. For example, the process may include, at operation 402, receiving, from a gNB, receiving configuration information for a first MBS-specific resource pool for receiving a first MBS and a second MBS-specific resource pool for receiving a second MBS. At operation 404, the process may further include receiving the first MBS using the first MBS-specific resource pool. At operation 406, the process may further include receiving the second MBS using the second MBS-specific resource pool.

Figure 5:
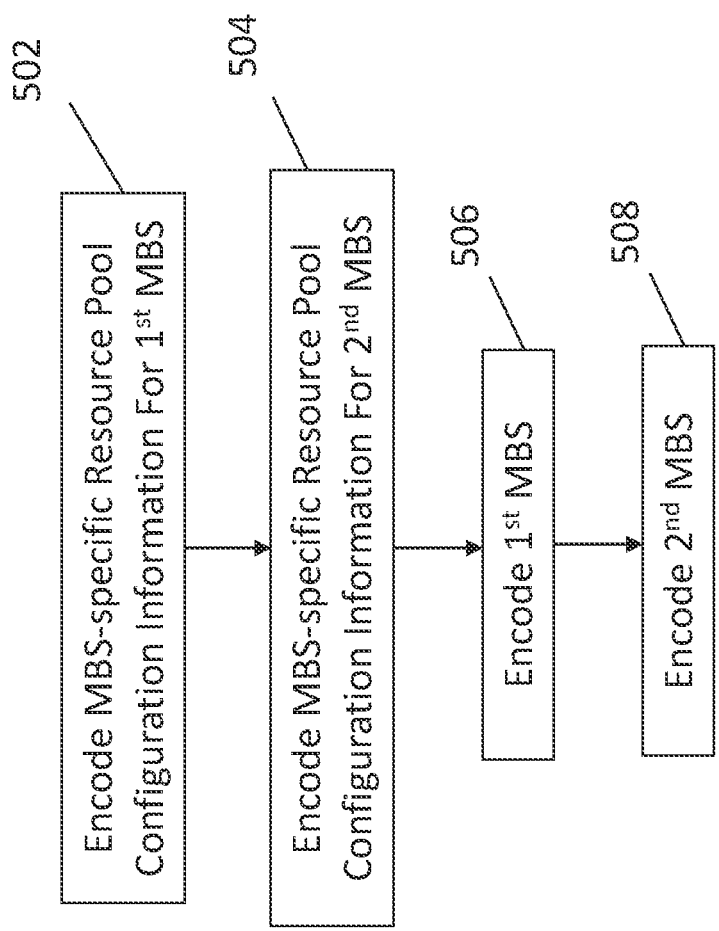
FIG. 5 illustrates another MBS process in accordance with some aspects.

FIG. 5 illustrates another MBS process in accordance with some aspects. FIG. 5 may be implemented by a gNB or a portion thereof. Other operations may be present, but are not shown for convenience. For example, the process may include, at operation 502, encoding, for transmission, configuration information for a first MBS-specific resource pool for receiving a first MBS. At operation 504, the process may further include encoding, for transmission, configuration information for a second MBS-specific resource pool for receiving a second MBS. At operation 506, the process may further include encoding the first MBS for transmission to a first group of UEs based on the first MBS-specific resource pool. At operation 508, the process may further include encoding the second MBS for transmission to a second group of UEs based on the second MBS-specific resource pool. The first and second groups of UEs may be different, but may include one or more common UEs.

In addition to the use of different MBS resource pools, support for time-domain multiplexed (TDMed) MBS and unicast PDSCH transmission in a slot is described to optimize the resource efficiency and system performance to fulfil the service requirements. Specifically, a mini-slot based MBS and unicast data transmission can be TDMed in a slot so that all symbols in a slot can be efficiently employed for the various data services. Moreover, a unicast PDSCH can be used for both unicast data traffic or retransmission of MBS data if the first transmission of the MBS data in the same slot is not correctly received by the UE. To support this, control channel search spaces allocation may use different DCI formats in a slot. This permits TDMed MBS and unicast PDSCH transmission to be supported and enable system to optimize the overall radio resource efficiency according to the MBS QoS requirements as well as the collective channel quality of all involved UEs.

Method—1: TDMed Unicast and Multicast/Broadcast Data Transmission in a Slot

In this method, if mini-slot based MBS and unicast physical downlink shared data channel (PDSCH) transmission are supported by all the involved UEs, MBS data and unicast data can be multiplexed in TDM manner within a slot. Specifically, when a mini-slot based MBS data is transmitted by using one or more leading symbols of a slot, the remaining symbols of the slot can be used for the unicast PDSCH transmission. The unicast PDSCH can include a data packet corresponding to a unicast data radio bearer. In addition to multicast-broadcast retransmission of MBS data with incorrect reception of the first transmission, when UE-specific Hybrid Automatic Repeat Request Acknowledgment (HARQ-ACK) feedback is employed for the MBS data reception, unicast retransmission of MBS data can be also transmitted by the gNB if only NACK feedback is received from one particular UE. In this case, some of the remaining symbols after the leading symbols used for MBS data new transmission in a slot can be also scheduled for a unicast PDSCH for MBS data retransmission. Such approach can be particularly useful when semi-persistent scheduled MBS data with mini-slot PDSCH transmission is transmitted at the beginning of a slot. This can improve the overall spectrum efficiency as well as the latency performance for those delay critical services.

Figure 6C:
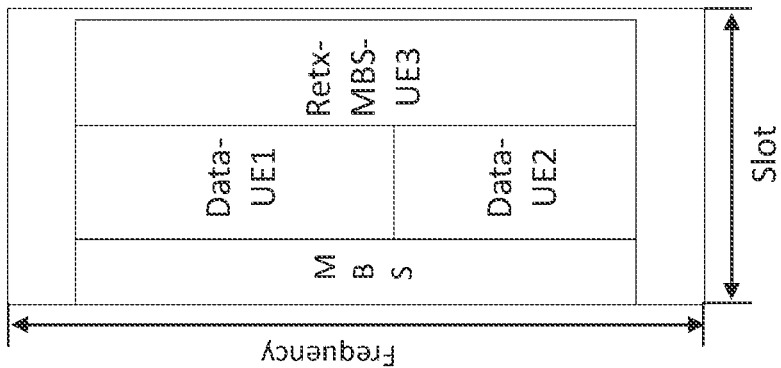
FIG. 6C illustrates TDMed mini-slots of MBS and unicast PDSCHs and unicast retx-MBS in accordance with some aspects.
Figure 6B:
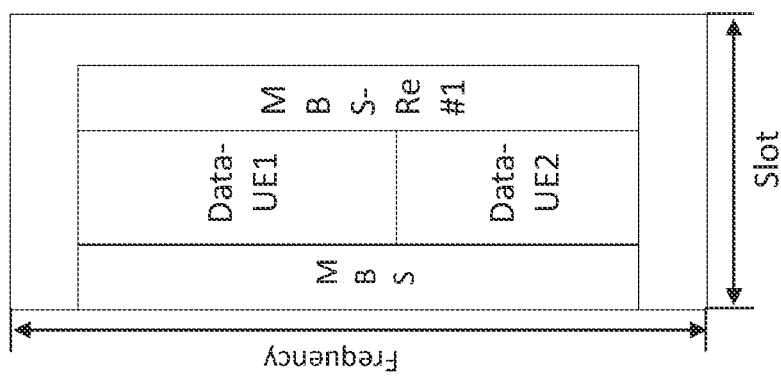
FIG. 6B illustrates TDMed mini-slots of MBS and unicast PDSCHs and retransmitted MBS (retx-MBS) in accordance with some aspects.
Figure 6A:
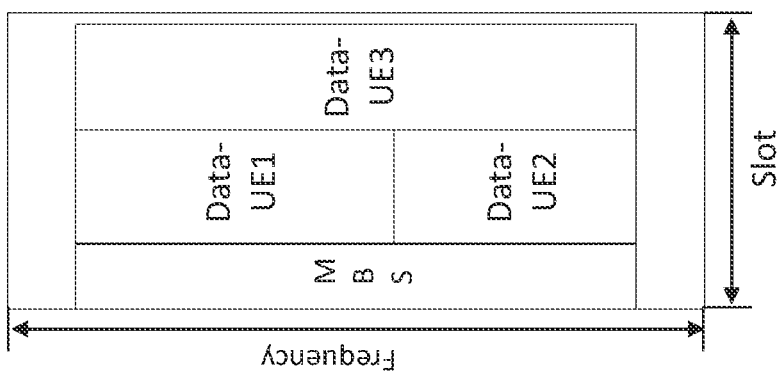
FIG. 6A illustrates time domain multiplexed (TDMed) mini-slots of MBS and unicast physical downlink shared channels (PDSCHs) in accordance with some aspects.

FIG. 6A illustrates time domain multiplexed (TDMed) mini-slots of MBS and unicast physical downlink shared channels (PDSCHs) in accordance with some aspects. FIG. 6B illustrates TDMed mini-slots of MBS and unicast PDSCHs and retransmitted MBS (retx-MBS) in accordance with some aspects. FIG. 6C illustrates TDMed mini-slots of MBS and unicast PDSCHs and unicast retx-MBS in accordance with some aspects. As shown in FIGS. 6A-6C, TDMed MBS data and unicast PDSCHs with mini-slot transmission can be transmitted in a slot. Specifically, as illustrated, MBS data is transmitted in the first mini-slot of the slot and unicast PDSCHs for UE1 and UE2 are transmitted in the $2^{nd}$ mini-slot of the slot. For the $3^{rd}$ mini-slot, three exemplary scenarios are given in FIGS. 6A-6C. In the first scenario shown in FIG. 6A, a unicast PDSCH for UE3 is transmitted in the $3^{rd}$ mini-slot of the slot. In the $2^{nd}$ scenario shown in FIG. 6B, MBS re-transmission data is transmitted in the $3^{rd}$ mini-slot. In the $3^{rd}$ scenario shown in FIG. 6C, a unicast PDSCH for UE3 carrying the retransmission of MBS data is transmitted in the $3^{rd}$ mini-slot. These exemplary scenarios represent the typical time-domain DL data multiplexing options with MBS data in a slot.

Method—2: Control Channel Search Space Configuration to Support TDMed Unicast and MBS Transmission In this method, control channel search space (SS) configuration options may be used to realize time-domain multiplexing options with MBS data in a slot described in Method-1. For a UE supporting MBS data traffic, a SS containing the group common PDCCHs scheduling MBS data transmission may be configured to the UE. For MBS with periodic traffic with a periodicity larger than 1 slot, a corresponding periodic SS can be configured to an MBS UE for dynamic scheduling MBS data transmission and activation/deactivation of SPS MBS transmission. When HARQ-ACK feedback is enabled for MBS data traffic with high reliability and low latency requirements, one or more additional SS for group common PDCCH scheduling the retransmission of erroneously received MBS data can be also configured to the MBS UE. To maximize the resource utilization, the SS scheduling retransmission of MBS data can also include the PDCCH candidates for DCI formats scheduling unicast PDSCH transmission. Moreover, to further optimize resource efficiency, the remaining symbols in a slot other than those symbols used for MBS data transmission and potential retransmission can be allocated to the SS scheduling unicast PDSCH. As a result, all the symbols in a slot with MBS mini-slot transmission can be optimally allocated to the unicast or MBS data according to the actual traffic QoS requirements.

Figure 7:
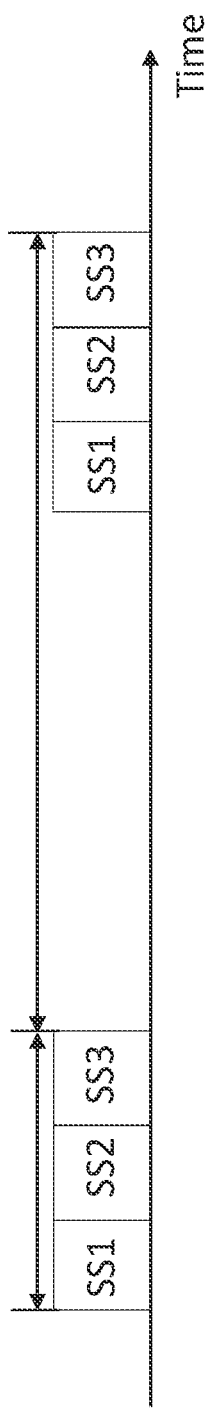
FIG. 7 illustrates a TDMed synchronization signal (SS) in a slot in accordance with some aspects.

FIG. 7 illustrates a TDMed SS in a slot in accordance with some aspects. As the example shown in FIG. 7, three periodic SSes, namely SS1, SS2 and SS3, can be allocated to a slot in TDM manner. Specifically, SS1 includes DCI formats for dynamic scheduling MBS data transmission and activation/deactivation of periodic MBS data transmission. SS2 includes DCI formats for scheduling unicast mini-slot data transmission to improve the resource utilization and latency performance of certain unicast traffic. SS3 contains both unicast and multicast-broadcast DCI formats for scheduling either unicast or MBS data retransmission. By virtue of MBS DCI formats from SS3, the retransmission of MBS data scheduled by DCI in SS1 which was incorrectly received by MBS UEs, can be scheduled in the same slot as the first transmission of the corresponding MBS data packet. This can be particularly beneficial for those IIoT use cases with demanding reliability and latency requirements.

Figure 8:
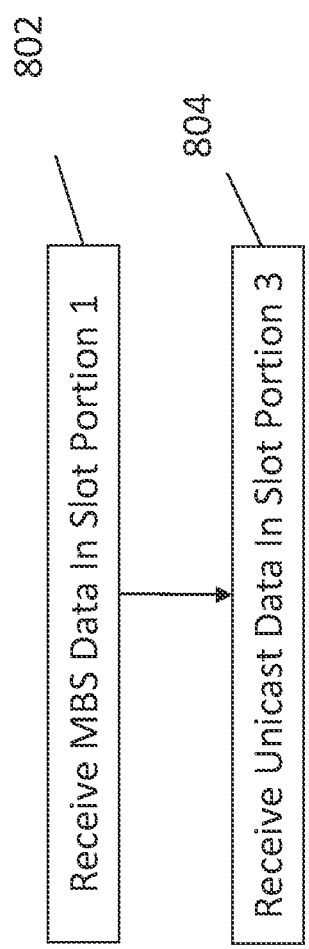
FIG. 8 illustrates another MBS process in accordance with some aspects.

FIG. 8 illustrates another MBS process in accordance with some aspects. FIG. 8 may be implemented by a UE or a portion thereof. Other operations may be present, but are not shown for convenience. For example, the process may include, at operation 902, receiving multicast/broadcast service (MBS) data in a first portion of a slot. At operation 804, the process may further include the process may further include receiving unicast data in a second portion of the slot.

FIG. 9 illustrates another MBS process in accordance with some aspects. FIG. 9 may be implemented by a gNB or a portion thereof. Other operations may be present, but are not shown for convenience. For example, the process may include, at operation 902, encoding, for transmission to a group of UEs, multicast/broadcast service (MBS) data in a first portion of a slot. At operation 904, the process may further include encoding, for transmission to a first UE of the group of UEs, unicast data in a second portion of the slot.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus for a user equipment (UE), the apparatus comprising:
   processing circuitry configured to:
      decode, from a $5^{th}$ generation NodeB (gNB), a configuration for each of a plurality of multicast-broadcast service (MBS)-specific common resource pools disposed in a slot, a first MBS-specific common resource pool of the plurality of MBS-specific common resource pools allocated for a first MBS transmission, a second MBS-specific common resource pool of the plurality of MBS-specific common resource pools allocated for a second MBS transmission;

decode, from the gNB, the first MBS transmission in the first MBS-specific common resource pool;

decode, from the gNB, the second MBS transmission in the second MBS-specific common resource pool;

decode, from the gNB, a control resource set (CORESET) in each of the first and second MBS-specific common resource pools, the CORESET specific to one of the first and second MBS-specific common resource pools in which the CORESET is transmitted; and decode, in each CORESET, a radio resource control (RRC) information element (IE) bandwidth part (BWP)-Downlink that contains an MBS-resourcePool IE, the MBS-resourcePool IE comprising an mbs-resourcePool-id parameter that defines an associated MBS-specific resource pool identification (ID) and a locationAndBandwidth parameter that defines a frequency domain location and bandwidth of the associated MBS resource pool in a bandwidth part; and a memory configured to store the configuration.

2. The apparatus of claim 1, wherein the first and second MBS-specific common resource pools do not overlap in frequency.

3. The apparatus of claim 1, wherein the first and second MBS-specific common resource pools at least partially overlap in frequency.

4. The apparatus of claim 3, wherein the first and second MBS-specific common resource pools fully overlap in frequency.

5. The apparatus of claim 3, wherein the processing circuitry is further configured to decode, from the gNB, scheduling of the first and second MBS transmissions for reception in different mini-slots within the slot.

6. The apparatus of claim 3, wherein:
the first and second MBS transmissions are periodic MBS transmissions, and
the processing circuitry is further configured to decode, from the gNB, scheduling of the first and second MBS transmissions for reception in different slots.

7. The apparatus of claim 1, wherein the first and second MBS-specific common resource pools have different bandwidths.

8. The apparatus of claim 1, wherein the processing circuitry is further configured to decode, from the gNB, a group common physical downlink control channel (PDCCH) scheduling the first and second MBS transmissions using resource addresses defined in the first and second MBS-specific common resource pools.

9. An apparatus for a 5th generation NodeB (gNB), the apparatus comprising:
processing circuitry configured to:
encode, for transmission to a user equipment (UE), a multicast-broadcast service (MBS) transmission in a first mini-slot of a slot; and
encode, for transmission to the UE, a unicast physical downlink shared data channel (PDSCH) transmission in a second mini-slot of the slot such that the MBS transmission and the unicast PDSCH transmission are time domain multiplexed (TDMed) within the slot;

decode, from the UE in response to transmission of the MBS transmission, Hybrid Automatic Repeat Request Acknowledgment (HARQ-ACK) negative feedback (NACK); and encode, for transmission to the UE in a third mini-slot of the slot in response to reception of the NACK, another unicast PDSCH transmission, the other unicast PDSCH transmission comprising a retransmission of the MBS transmission; and a memory configured to store the MBS transmission.

10. The apparatus of claim 9, wherein the processing circuitry is configured to encode the MBS transmission in at least one leading symbol of the slot.

11. The apparatus of claim 9, wherein the processing circuitry is further configured to encode, for transmission to another UE, another unicast PDSCH transmission, the other unicast PDSCH transmission frequency division multiplexed (FDMed) with the unicast PDSCH transmission.

12. The apparatus of claim 9, wherein the processing circuitry is configured to encode the MBS in at least one leading symbol of the slot, the unicast PDSCH transmission after the MBS, and the other unicast PDSCH transmission after the unicast PDSCH transmission.

13. The apparatus of claim 9, wherein the processing circuitry is further configured to encode, for transmission to the UE, a search space (SS) configuration for a first SS containing a first group common physical downlink control channel (PDCCH), the first group common PDCCH comprising a first downlink control information (DCI) format to at least one of schedule the MBS transmission or activate or deactivate periodic MBS transmissions.

14. The apparatus of claim 13, wherein the processing circuitry is further configured to encode, for transmission to the UE, a second SS containing a second group common PDCCH, the second group common PDCCH comprising a second DCI format to schedule another unicast PDSCH transmission, the other unicast PDSCH transmission comprising a retransmission of the MBS transmission, the first and second SS allocated to the slot using TDM.

15. The apparatus of claim 14, wherein the processing circuitry is further configured to encode, for transmission to the UE, a third SS containing a third group common PDCCH, the third group common PDCCH comprising a third DCI format to schedule the unicast PDSCH transmission, the first, second, and third SS allocated to the slot using TDM.

16. A non-transitory computer-readable storage medium that stores instructions for execution by one or more processors of a user equipment (UE), the one or more processors to configure the UE to, when the instructions are executed:
decode, from a $5^{th}$ generation NodeB (gNB), a configuration for each of a plurality of multicast-broadcast service (MBS)-specific common resource pools disposed in a slot, a first MBS-specific common resource pool of the plurality of MBS-specific common resource pools allocated for a first MBS transmission, a second MBS-specific common resource pool of the plurality of MBS-specific common resource pools allocated for a second MBS transmission;

decode, from the gNB, the first MBS transmission in the first MBS-specific common resource pool;

decode, from the gNB, the second MBS transmission in the second MBS-specific common resource pool;

decode, from the gNB, a control resource set (CORESET) in each of the first and second MBS-specific common resource pools, the CORESET specific to one of the first and second MBS-specific common resource pools in which the CORESET is transmitted; and decode, in each CORESET, a radio resource control (RRC) information element (IE) bandwidth part (BWP)-Downlink that contains an MBS-resourcePool IE, the MBS-resourcePool IE comprising an mbs-resourcePool-id parameter that defines an associated MBS-specific resource pool identification (ID) and a locationAndBandwidth parameter that defines a frequency domain location and bandwidth of the associated MBS resource pool in a bandwidth part.

17. The medium of claim 16, wherein the first and second MBS-specific common resource pools do not overlap in frequency.

18. The medium of claim 16, wherein the first and second MBS-specific common resource pools at least partially overlap in frequency.

19. The medium of claim 18, wherein the processing circuitry is further configured to decode, from the gNB, scheduling of the first and second MBS transmissions for reception in different mini-slots within the slot.

20. The medium of claim 18, wherein:
the first and second MBS transmissions are periodic MBS transmissions, and
the instructions, when executed, further cause the one or more processors to configure the UE to decode, from the gNB, scheduling of the first and second MBS transmissions for reception in different slots.

* * * * *